United States Patent [19]
Brown

[11] 4,450,863
[45] May 29, 1984

[54] SERIES CONNECTED SOLENOID APPLIANCE CONTROL VALVE ASSEMBLY

[75] Inventor: Wade R. Brown, Saint Charles, Ill.

[73] Assignee: Eaton Corporation, Cleveland, Ohio

[21] Appl. No.: 263,199

[22] Filed: May 13, 1981

[51] Int. Cl.³ .................................... F16K 31/02
[52] U.S. Cl. ........................ 137/613; 137/614.11; 251/30; 251/38; 251/45; 251/141; 134/57 D; 134/58 D; 335/267
[58] Field of Search ............... 137/613, 614.11; 251/30, 38, 45, 137, 141; 335/267, 266, 265, 256; 134/57 D, 58 D

[56] References Cited

U.S. PATENT DOCUMENTS

| | | | |
|---|---|---|---|
| 2,500,750 | 3/1950 | Halenza | 251/38 |
| 2,550,297 | 4/1951 | Ray | 251/137 |
| 2,587,356 | 2/1952 | McPherson | 137/613 |
| 3,035,611 | 5/1962 | Collins | 251/30 |
| 3,378,031 | 4/1968 | Hatashita | 335/267 |
| 3,472,277 | 10/1969 | Reinicke et al. | 335/267 |
| 3,646,948 | 3/1972 | Athey | 134/57 D |
| 3,818,398 | 6/1974 | Barbier et al. | 251/38 |
| 3,872,878 | 3/1975 | Kozel et al. | 251/45 |

Primary Examiner—A. Michael Chambers
Attorney, Agent, or Firm—Fay & Sharpe

[57] ABSTRACT

An automatic dishwasher includes a water inlet line, a flow control valve assembly, a wash water introducing means for introducing wash water into a container which is adapted to receive dishes, and control means for selectively controlling the flow control valve assembly. The flow control valve assembly includes a first flow control valve which is selectively actuated by a first solenoid coil and a second flow control valve which is selectively actuated by a second solenoid coil. A first ferromagnetic member is disposed between a first end of the solenoid coils and a second ferromagnetic member is disposed between the other end of the solenoid coils. The solenoid coils are so interconnected that when an actuating potential is applied across them, they are electrically in series. The series connection of the coils allows the coils to be configured such that a significant saving in the cost of coil wire is achieved over parallel connected coils. Creating the magnetic fields with the opposite polarity causes a closed magnetic flux path through both solenoid coils and both ferromagnetic members such that the coils act in concert to boost the strength of the magnetic fields that they generate.

9 Claims, 3 Drawing Figures

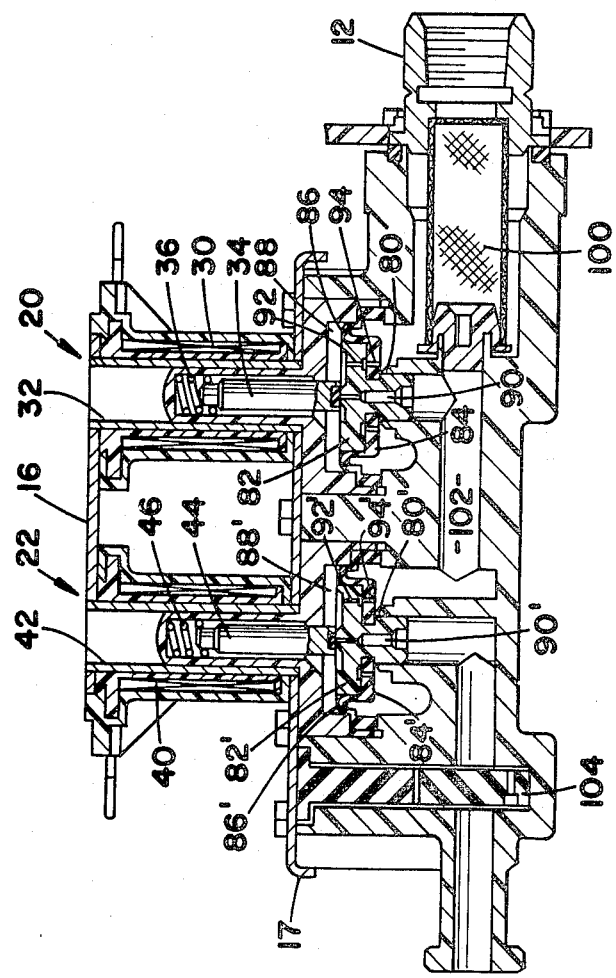

SERIES CONNECTED SOLENOID APPLIANCE CONTROL VALVE ASSEMBLY

BACKGROUND OF THE INVENTION

This application pertains to the art of solenoid actuated flow control valve assemblies and more particularly to fail-safe flow control valves. The invention is particularly applicable to valves for electrical appliances, especially dishwashers, and will be described with particular reference thereto. It will be appreciated, however, that the invention has broader applications in which a fail-safe shut-off of fluid flow is advantageous, such as washing machines, gas appliances, humidifiers, or the like.

Heretofore, flow control valve assemblies for dishwashers and the like have commonly included a valve housing with an inlet port at one end and an outlet port at the other. A first solenoid actuated flow control valving means and a second solenoid actuated flow control valving means were connected hydraulically in series between the inlet and outlet ports. In order for fluids to flow from the inlet port to the outlet port, both flow control valving means had to assume a flow permitting state. If either flow control valving means failed to function, the other was still able to terminate the fluid flow. The solenoid coil of the first valving means and the solenoid coil of the second valving means were electrically connected in parallel to be actuated simultaneously with an actuating voltage applied by a control means.

An exemplary prior art flow control valve assembly is illustrated in U.S. Pat. No. 3,593,957 to Paul Dolter, William McCarty, Jr. and Wesley Swanson, issued July 1971 and assigned to the assignee herein. In this prior art valve assembly, the first and second solenoid coils were designed to minimize the heat generated in the solenoid coils. Because heat varies with the square of the coil current and the coil current varies directly with the actuating voltage and inversely with the coil resistance, the solenoid coils were designed to have a relatively high resistance. Specifically, the solenoid coils were made with a relatively long length of relatively thin, i.e., high gauge, wire which has a relatively high resistance per unit length. In a commercial product manufactured under the Dolter et al. patent, the coil was 6300 turns of #39 copper wire which has a resistance of 0.8466 ohms per foot.

One of the problems with the prior art is that thin, high gauge wire is relatively expensive, because its manufacture is labor intensive. This labor intensity results in thin, high gauge wire being priced significantly higher per pound than thicker, lower gauge wire. However, if a cheaper, lower gauge wire were substituted for the #39 wire, above, the coil current would increase as would the heat generated.

In the prior art, the first and second solenoid coils were each connected with a pair of electrical connection lugs or posts. The actuating voltage was supplied to the solenoid coils by a pair of electrical leads from the dishwasher control circuit and a wiring harness. The wiring harness included a pair of jumper wires for interconnecting the lugs of the first and second solenoid coils together in a parallel circuit connection. Friction connectors were used to connect the electrical control leads and the wiring harness with the solenoid lugs. Because the control leads and the jumper wires both needed to be connected to the same pair of lugs, two dual wire friction connectors were required and two single wire friction connectors at the other ends of the jumper wires were required.

Another problem resides in the prior art wiring connection system including the cost of both labor and materials. The dual wire friction connectors are more expensive than single wire connectors and two jumper wires are more expensive than one.

The present invention contemplates a new and improved solenoid actuated flow control valve assembly for dishwashers and other appliances which overcomes or improves upon the above-referenced problems and others. Yet, it provides a valve assembly which is simple to install and economical to manufacture.

SUMMARY OF THE INVENTION

In accordance with a first aspect of the present invention, there is provided an automatic dishwasher including a water inlet line, a flow control valve assembly, a wash water introducing means for introducing wash water into a container which is adapted to receive dishes, and control means for selectively controlling the flow control valve assembly. The flow control valve assembly includes a first flow control valve which is selectively actuated by a first solenoid and a second flow control valve which is selectively actuated by a second solenoid. The first and second solenoids are electrically connected in series and with the control means such that they are adapted to receive an actuating potential therefrom.

In accordance with another aspect of the invention, there is provided a solenoid actuated valve assembly for use in electrical appliances. The valve assembly comprises a valve housing, a first solenoid actuated flow control valve, a second solenoid actuated flow control valve, and connecting means for connecting an actuating potential to the first and second flow control valves. The valve housing includes a first and a second ferromagnetic member, at least one inlet port, and at least one outlet port. Each of the solenoid actuated flow control valves includes a solenoid coil disposed in the valve housing between the first and second ferromagnetic members, a valve seat and closure which selectively permit and prohibit the flow of fluid through the flow control valve, and an armature movably disposed at least partially in the solenoid coil and operatively connected with the valve closure such that movement of the armature causes the valve seat and closure selectively to permit and prohibit fluid flow. The connecting means connects the first and second solenoids in series such that the first and second flow control valves are controlled together.

One advantage of the present invention is that it allows the solenoid coils to be wound with a less expensive thicker, lower gauge wire.

Another advantage of the present invention is that it allows the solenoid coils to be wound with fewer turns.

Yet another advantage of the present invention is that only a single jumper wire is required and fewer or no dual wire connectors are required in the wiring harness.

Still further advantages will become apparent to others upon reading and understanding the following detailed description of the preferred embodiment.

BRIEF DESCRIPTION OF THE DRAWINGS

The figures are only for purposes of illustrating a preferred embodiment of the present invention. Because the invention may take form in various parts and arrangements of parts, the figures herein are not to be construed as limiting the invention. The figures show:

FIG. 3 is a sectional view of the valve assembly of FIG. 2 through section 3—3.

DESCRIPTION OF THE PREFERRED EMBODIMENT

Figure 1:
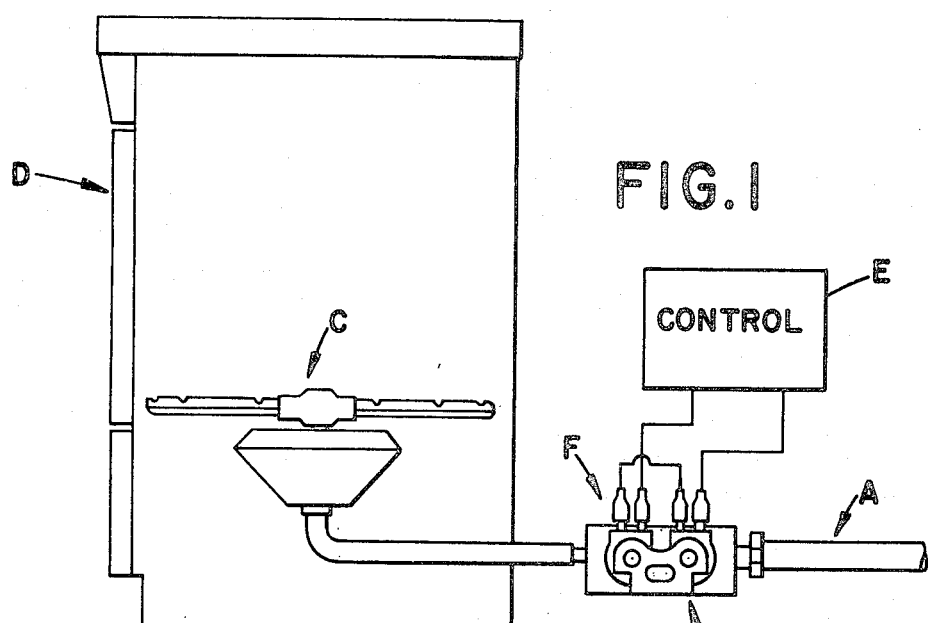
FIG. 1 is a diagrammatic illustration of an automatic dishwasher in accordance with the present invention.

Looking to FIG. 1, an automatic dishwasher includes a water or fluid inlet line A which brings water or other fluids to the appliance. A dual solenoid flow control valve assembly B connects the inlet line A with a wash water introducing means C for introducing wash water into defined area D which is adapted to support dishes which are to be washed. A control means E selectively provides an actuating potential for causing the flow control valve assembly to change between a fluid flow permitting state which permits water to flow from the water inlet line to the water introducing means and a fluid flow prohibiting state which blocks the flow of water. A connecting means F electrically connects the solenoids of the valve assembly A electrically in series across the actuating potential of the control means and magnetically in series such that a magnetic flux loop flows through both solenoids.

Figure 2:
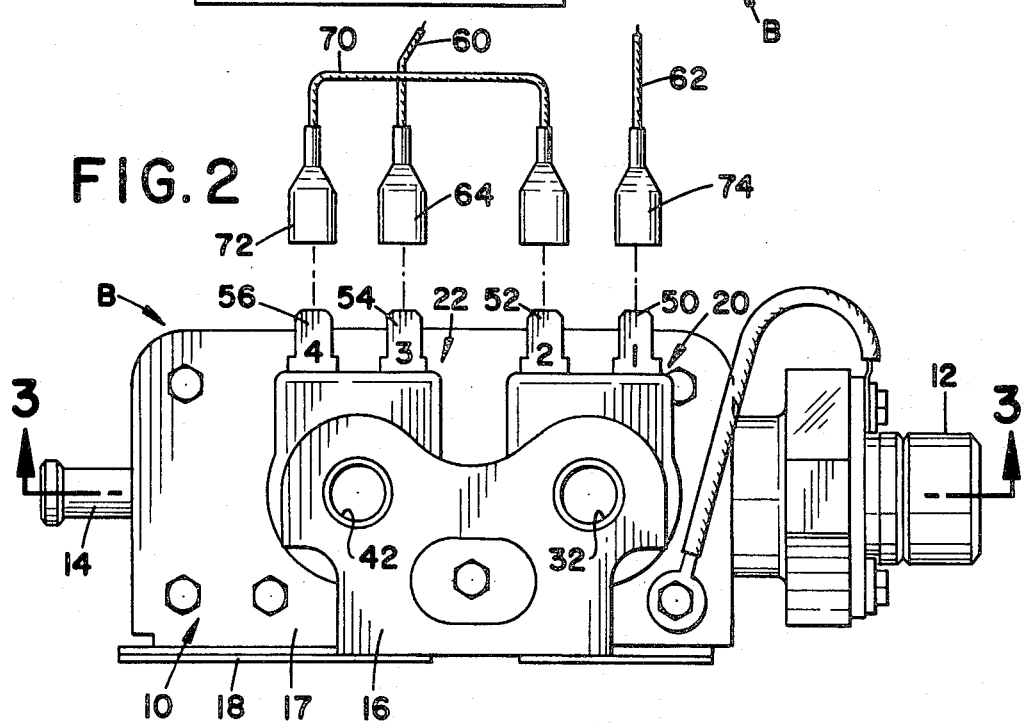
FIG. 2 is a top plan view of a solenoid actuated flow control valve assembly in accordance with the present invention.

With reference to FIG. 2, the valve assembly B includes a valve housing 10 having an inlet port 12 at one end which is adapted to receive water or other fluids from the fluid inlet line A and an outlet port 14 at its other end for discharging water or other fluids. An upper ferromagnetic member 16 is disposed along the top surface, a lower ferromagnetic member 17 is disposed along an intermediate surface of the valve body, and a rear magnetically interconnecting member 18 integrally and magnetically connects the upper and lower members. Disposed hydraulically in series within the valve body 10 between the inlet and outlet ports are a first solenoid actuated flow control valve 20 and a second solenoid actuated flow control valve 22. The first and second flow control valves each have at least a flow permitting state and a flow prohibiting state. Because the valves are hydraulically in series, when both valves are in the flow permitting state, the fluids are permitted to flow between the inlet port 12 and the outlet port 14. However, when one or both of the flow control valves is in its flow prohibiting state, fluids are prohibited from flowing between the inlet and outlet ports. This redundancy insures that the fluid flow will be terminated even if one of the flow control valves malfunctions or jams. This fail-safe shut-off protection is desirable in appliances such as dishwashers which are apt to overflow if incoming water is not terminated at the appropriate times. The fail-safe shut-off protection is also advantageous for controlling natural gas flow.

With continued reference to FIG. 2 and particular reference to FIG. 3, the first flow control valve 20 includes a first solenoid coil 30 which is wrapped circumferentially around a cylindrical armature receiving area 32. Disposed within the armature receiving area is a first armature 34 for selectively causing the first flow control valve 20 to assume its flow permitting or its flow prohibiting state. A mechanical biasing means such as a coil spring 36 biases the armature 34 toward a position in which it causes the first flow control valve to assume its flow prohibiting state. When electric current flows through the solenoid coil 30, a sufficient magnetic flux is generated in the armature receiving area 32 to draw the armature 34 against the biasing means into a position which allows the first flow control valve 20 to assume its flow permitting state. Upon removal of current from the solenoid coil 30, the biasing means automatically returns the flow control valve to its flow prohibiting state.

The second flow control valve 22 includes a second solenoid coil 40 which is wrapped circumferentially around a second armature receiving area 42. Disposed in the armature receiving area 42 is an armature 44 and biasing means such as coil spring 46 for biasing the armature and the second flow control valve toward its flow prohibiting state. As with the first flow control valve, applying a current to the second solenoid coil 40 moves the armature 44 against the biasing means selectively causing the second flow control valve to assume its flow permitting state. When no current flows through the second solenoid coil 40, the biasing means 46 moves the armature 44 to a position in which it selectively causes the second flow control valve to assume its flow prohibiting state.

The first and second solenoid coils 30 and 40 are so wound and so interconnected with the control means E that when actuated they have the opposite polarity. That is, one has its north pole up and its south pole down and the other has its south pole up and its north pole down. This opposite polarity arrangement allows the magnetic flux from the two coils to interact cooperatively. The two coils create a flux loop with the flux flowing up one of the armature receiving areas, across the upper ferromagnetic member 16, down the other armature receiving area, and across the lower ferromagnetic member 17 back to the first armature receiving area, as well as following their own loops through the rear interconnecting portion 18. As distinguished from the prior art aligned polarity arrangement, the present opposite polarity arrangement shortens the return magnetic flux path and allows both coils to act in concert to generate the flux. This cooperation produces a stronger magnetic field for the same actuating potential. This opposite polarity arrangement is also applicable to valve assemblies with flow control valves which are connected hydraulically in parallel such as hot and cold water flow control valves of washing machines or which are connected electrically in parallel.

In designing solenoid coils, there are several factors to be taken into consideration. One consideration is that sufficient magnetic flux must be generated to move the armature against the biasing means. The magnetic flux varies with the current through the coil and with the number of turns in the coil, i.e., the ampere turns. The coil current varies directly with the actuating voltage and inversely with the coil reactance. Another consideration is to minimize the heat build-up in the valve. The heat build-up is caused by the power consumed by the coil which varies with the square of the current and with the resistance of the coil. The resistance portion of the coil reactance varies with the resistance of the wire per unit length which is a function of the gauge of the wire and with the length of the wire which is proportional to the number of turns. Various other interrelated factors, such as the back electromotive force from the armature, contribute to the performance characteristics of the coil. It will be appreciated that by decreasing the gauge of the wire, i.e., increasing its diameter, the resistance of the wire per unit length will diminish while the current flow, the power consumed, the heat, and possibly the magnetic flux will increase. Thus, a complex trade off or balancing must be performed in designing the coil to meet preselected parameters.

In the prior art in which the solenoid coils were connected in parallel, it was found that sufficient magnetic flux could be generated with an acceptable amount of heat when the coil was made of about 6300 turns of #39 wire when actuated with about 120 volts. This configuration utilizes about 0.0385 pounds of copper per coil. The #39 copper wire has the resistance of 0.8466 ohms per foot.

By distinction, in the present invention the solenoid coils 30 and 40 are connected electrically and magnetically in series. The present inventor has found that this series connection enables the coils to be made of a lower gauge or thicker wire which has less resistance per foot. In the preferred embodiment, #36 wire which has 0.4148 ohms per foot of resistance is preferred. The lower resistivity of the heavier wire enables the coils to handle a higher current which in turn reduces the number of turns required to produce sufficient magnetic flux. In the preferred embodiment, it has been found that about 3200 turns of #36 wire produce satisfactory results when actuated with 120 volts. This configuration utilizes about 0.0413 pounds of copper per coil.

The manufacture of copper wire tends to be both labor intensive and material intensive. The amount of material per foot of wire varies with the square of the radius. Thus, as the size of the wire decreases, i.e., the gauge increases, the cost of materials per unit length decreases. In manufacturing wire, the copper is alternately and repeatedly drawn to a smaller diameter and annealled. Because thinner wire requires more drawing and annealling steps, it is more expensive than thicker wire. By way of example, on Apr. 17, 1980, #39 copper wire was selling for $2.5795 per pound whereas #36 copper wire was selling for $2.1591 per pound. Although the price of wire will vary primarily with variations in the cost of copper, the differential between the #36 and #39 wire will vary with the cost of labor. With these wire prices, it can be seen that the difference in cost between the 0.0385 pound coil of #39 wire and the 0.0413 pound coil of #36 wire results in about a 10% price savings with the #36 wire coil over the #39 wire coil. Although #36 wire is illustrated in detail, it is to be appreciated that other gauges can be used to advantage.

With particular reference to FIG. 2 and continued reference to FIG. 3, the first solenoid coil 30 includes a length of #36 wire which is connected at one end with a first electrical connection lug 50 and connected at its other end with a second electrical connection terminal lug 52. The intermediate portion of the first length of wire is wrapped in a first direction around the armature receiving area 32. The second solenoid coil 40 includes a continuous length of #36 copper wire which has one end connected with a third electrical connection lug 54 and its other end connected with a fourth electrical connection lug 56. The intermediate portion of the second length of wire is wrapped 3200 times around the second armature receiving area 42 in the same first direction as the first solenoid coil 30. The electrical connection lugs 50, 52, 54 and 56 are included in the connecting means F.

With continued reference to FIG. 2, the connecting means further includes a pair of electrical leads 60 and 62 extend from the control means E to the valve assembly B for actuating both flow control valves 20 and 22. Connected with the ends of control leads 60 and 62 are electrical connection friction connectors 64 and 66, respectively, which are adapted to be received in an electrically conductive frictional engagement with the electrical connection lugs of the valve assembly. A jumper wire 70 has a first electrical connection friction connector 72 connected to one end and a second connector 74 connected with the other end. One of electrical leads 60 and 62 is connected with one of lugs 50 and 52 and the other is connected with one of lugs 54 and 56. The jumper wire 70 is connected between the other of lugs 50 and 52 and the other of lugs 54 and 56. In the preferred embodiment in which both solenoid coils are wound in the same direction, the opposite magnetic polarity is achieved by connecting electrical lead 60 with lugs 50 or 54 and lead 62 with the other of lugs 50 and 54. Alternately, leads 60 and 62 could be connected with the second and fourth lugs 52 and 56. The jumper wire 70 is connected between the other two lugs. In this manner, solenoid coils 30 and 40 are connected in series such that the current flows in opposite directions through each of the coils. Alternately, the solenoid coils may be wound in the opposite direction and the current caused to flow the same way through each coil.

With particular reference to FIG. 3, it is to be appreciated that the first and second solenoid actuated flow control valves 20 and 22 are substantially the same. Accordingly, the first flow control valve 20 is described below in detail and it is to be understood that this description applies by analogy to the second flow control valve 22. For simplicity of illustration, like elements of the second flow control valve in the description below are marked with the same reference numeral as the corresponding part with the first flow control valve followed by a prime ('). The first flow control valve includes a valve seat 80 which is an integral part of the valve body. An annular valve closure interacts with the valve seat for selectively permitting and prohibiting the flow of fluids through the flow control valve 20. The valve closure includes a backing member 82 and resilient sealing member 84 which seats on the valve seat 80 to prohibit the flow of fluids. The resilient sealing member is integral with a bellows arrangement 86 which defines a cavity 88 above the backing member 82. A first passage 90 connects the cavity 88 with the outlet port 14. A narrow second passage including aperture 92 in the backing member 82 and apertures 94 in the sealing member 84 connect the cavity 88 with the inlet port 12. The solenoid armature 34 opens and closes the narrow passage 90. In operation, the second passage through apertures 92 and 94 allows a pressure equilibrium to be established between cavity 88 and the incoming fluid pressure. In the equilibrium state, there is no net pressure tending either to raise or lower the sealing member 84. When the valve is to be opened, the armature 34 is caused to open first passage 90 which allows fluid in cavity 88 to drain through passage 90 to the outlet port. This causes a pressure differential across the sealing member 84 in which the pressure of the fluids from the inlet line lifts the sealing disc 84 opening the valve. When it is desired to return the valve to its flow prohibiting state, the armature closes the first passage 90 and spring 36 provides a downward bias on the sealing disc 84. The second passage allows an equilibrium pressure condition to again be established between the inlet pressure and cavity 88 allowing the sealing member 84 to assume a secure sealing condition with the valve seat 80.

Fluid entering the fluid inlet port 12 is filtered by a screen 100 to remove particles. The flow of fluid is permitted or blocked by the state of the first flow control valve 20. If the first flow control valve 20 is in its fluid permitting state, the fluid flows through a connecting passage 102 to the second flow control valve 22. If the second flow control valve 22 is in its flow permitting state, the fluid flows through a flow limiter 104 to the outlet port 14. The flow limiter 104 is a resilient disc with an aperture therein. As the pressure against the disc increases, the disc flexes decreasing the size of the aperture. In this manner, a relatively constant flow rate is maintained with fluctuations in pressure.

The invention has been described with reference to the preferred embodiment. Obviously, modifications and alterations will occur to those of ordinary skill in the art upon reading and understanding the preceding specification. It is intended that the invention include all such modifications and alterations that come within the scope of the appended claims or the equivalents thereof.

Having thus described the preferred embodiment of my invention, I now claim my invention to be:

1. An automatic dishwasher comprising:
   (a) a water inlet line;
   (b) a flow control valve assembly operatively connected with the water inlet line for controlling the water therethrough;
   (c) wash water introducing means for introducing wash water into a container which is adapted to receive dishes, the wash water introducing means being operatively connected with the water inlet line downstream from the flow control valve assembly;
   (d) electrical control means for selectively producing an electrical actuating potential on a control means output for controlling the flow control valve assembly such that water is selectively enabled to flow from the water inlet line to the water introducing means;
   (e) the flow control valve assembly including first and second independently actuated pilot operated fluid valves connected fluidically in series such that the first and second fluid valves are each actuatable alone and independently to block the flow of fluid therethrough, the flow control valve assembly including:
      (i) the first pilot operated fluid valve having a first valve seat and a first valve closure for selectively controlling fluid flow therethrough, the first valve closure defining a first pilot reservoir toward a side thereof opposite to the first valve seat, a first pilot inlet aperture for connecting the first pilot reservoir upstream of the first valve seat, a first pilot outlet aperture for connecting the first pilot reservoir downstream of the first valve seat, a first solenoid coil, and a first armature, the first armature being axially movable in the first solenoid coil and being operatively connected with the first pilot outlet aperture for selectively controlling fluid flow therethrough to control the relative position of the first valve closure and the first valve seat;
      (ii) the second pilot operated fluid valve fluidically in series with the first pilot operated pilot valve, the second fluid valve including a second valve seat, a second valve closure for selectively controlling fluid flow through the second valve seat, the second valve closure defining a second pilot reservoir toward a side opposite the second valve seat, a second pilot inlet aperture for connecting the second pilot reservoir upstream of the second valve seat, a second pilot outlet aperture for connecting the second pilot reservoir downstream of the second valve seat, a second solenoid coil, and a second armature, the second armature being axially movable in the second solenoid coil and operatively interacting with the second pilot outlet aperture for selectively controlling fluid flow therethrough to control the relative position of the second valve closure and the second valve seat;
      (iii) connecting means for connecting the first and second solenoid coils electrically in series across the electrical actuating potential at the control means output;
      (iv) the series connected first and second solenoid coils having substantially the same electrical impedance as a pair of parallel connected solenoid coils, the first and second series connected solenoid coils each having substantially the same plural number of turns which plural number of turns is generally half the number of turns as a pair of parallel connected solenoid coils, and the first and second series connected solenoid coils each having an electrical resistance per unit length which is generally half the resistance per unit length of the parallel connected coils, whereby the serially connected first and second coils have generally half the number of turns and half the electrical resistance per unit length as the parallel connected coils, such that each series connected coil has generally a quarter of the resistance of a single parallel connected coil.

2. The automatic dishwasher as set forth in claim 1 wherein the first solenoid is operatively connected with a first electrical connection lug and a second electrical connection lug, and wherein the second solenoid is operatively connected with a third electrical connection lug and a fourth electrical connection lug.

3. The automatic dishwasher as set forth in claim 2 wherein the connecting means includes a first electrical lead having a connector at one end which electrically engages the first electrical connection lug and connected at another end with the control means output, a second electrical lead having a connector at one end which electrically engages the third electrical connection lug and connected at another end with the control means output, and a jumper wire with a first connector at one end which electrically engages the second electrical connection lug and a second connector at its other end which electrically engages the fourth electrical connection lug, whereby the first and second solenoids are connected in series across the first and second electrical leads.

4. The automatic dishwasher as set forth in claim 3 wherein the connector frictionally engages the electrical connection lugs.

5. The automatic dishwasher as set forth in claim 1 wherein said first solenoid includes a first length of wire having a first end, a second end, and a central portion wrapped circumferentially about a first armature receiving area in a first direction and,
   wherein said second solenoid coil includes a second length of wire having a first end, a second end, and a central portion wrapped circumferentially about a second cylindrical armature receiving area in said first direction.

6. A solenoid actuated valve assembly for use in electrical appliances, the valve assembly comprising:
   a valve housing including an inlet port and an outlet port;
   a first solenoid actuated, pilot operated flow control valve including a first solenoid coil disposed in the valve housing, a first valve seat and a first valve closure which selectively permit and prohibit the flow of fluid through the first flow control valve, the first valve seat and first valve closure being disposed in the valve housing in fluid connection with the inlet port, and a first armature movably disposed at least partially within the first solenoid coil and operatively connected with the first valve closure such that movement of the first armature causes the first valve seat and first valve closure selectively to permit and prohibit fluid flow, the first solenoid coil including about 3200 turns of #36 copper wire;
   a second solenoid actuated, pilot operated flow control valve including a second solenoid coil disposed in the valve housing, a second valve seat and second valve closure which selectively permit and prohibit the flow of fluid through the second flow control valve, the second valve seat and second valve closure being disposed in the valve housing in fluid connection with the outlet port, and a second armature movably disposed at least partially within the second solenoid coil and operatively connected with the second valve closure such that movement of the second armature causes the second valve seat and closure selectively to permit and prohibit fluid flow, the second solenoid coil including about 3200 turns of #36 copper wire; and,
   connecting means for connecting the first and second solenoid coils electrically in series such that when the solenoid coil of one of the pilot operated flow control valve shorts out an actuating potential actuates the the other pilot operated flow control valve whereby the solenoid coil of said other pilot operated flow control valve provides a load across which the actuating potential is applied.

7. The valve assembly as set forth in claim 6 further including a connecting passage disposed in the valve housing in fluid connection with the first and second flow control valves, whereby the first and second flow control valves are connected hydraulically in series between the inlet and outlet ports.

8. The valve assembly as set forth in claim 7 wherein one end of the first solenoid coil is connected with a first electrical connection lug, one end of the second solenoid is connected with another electrical connection lug and wherein the connecting means operatively connects the other ends of the first and second solenoid coils with each other.

9. The valve assembly as set forth in claim 8 wherein the connecting means further includes a first electrical lead with a friction connector at one end which frictionally engages the first lug and a second electrical lead with a friction connector at one end which frictionally engages the other lug, the first and second leads being adapted selectively to supply the actuating potential to the first and second solenoid coils.

* * * * *